Patented Nov. 1, 1932

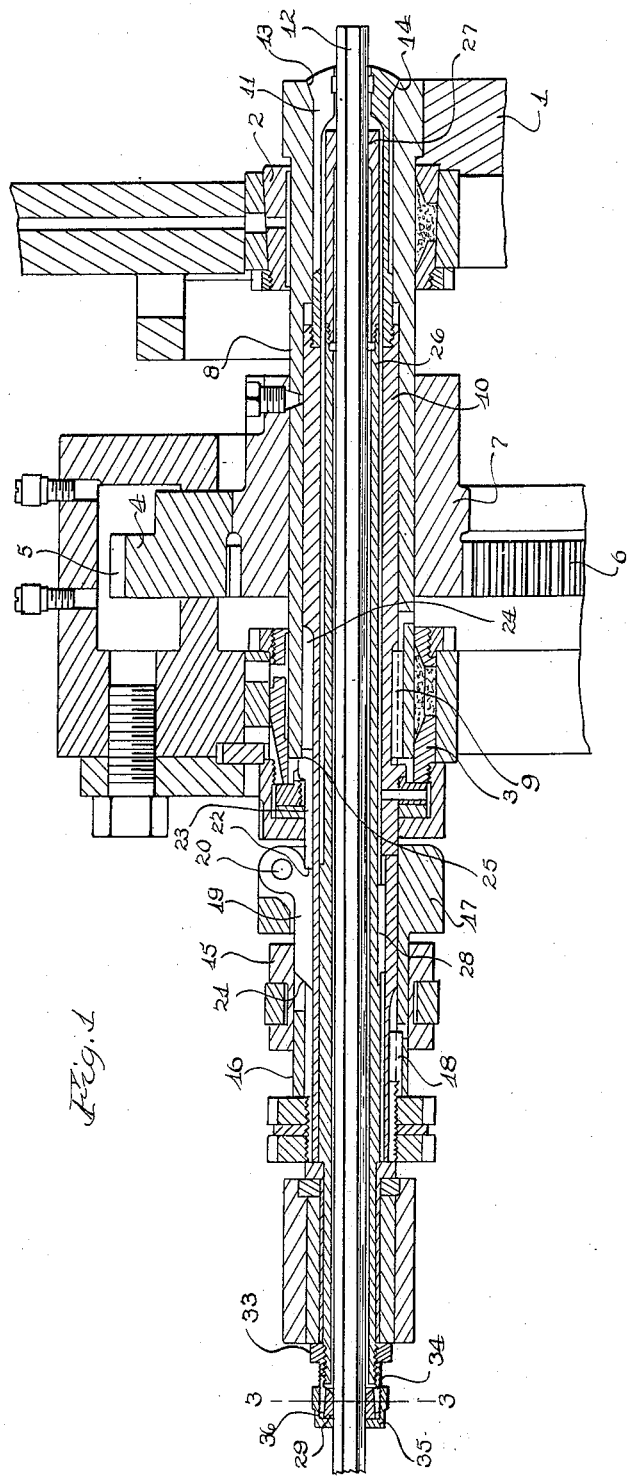

1,885,224

UNITED STATES PATENT OFFICE

EARL W. BRINKMAN AND EDWARD S. KLINE, OF ROCHESTER, NEW YORK, ASSIGNORS TO DAVENPORT MACHINE TOOL CO., INC., OF ROCHESTER, NEW YORK, A CORPORATION OF NEW YORK

AUTOMATIC TOOL MACHINE

Application filed April 20, 1931. Serial No. 531,381.

The present invention relates to automatic tool machines and more particularly to the work holders thereof. An object of the invention is to make it easy for an operator to insert hexagon, square or other polygon shaped stock. Another object of the invention is to make it possible to position the stock at the intake or intake end of the feed tube so that it can be aligned with the feed fingers and the chuck at the other end of the work holder.

To these and other ends, the invention consists of certain parts and combinations of parts, all of which will be hereinafter described: the novel features being pointed out in the appended claims.

In the drawing:

Fig. 1 is an axial section through a work holder with adjacent parts of the screw machine shown in section;

Fig. 2 is an enlarged sectional view at the intake end of the work holder;

Fig. 3 is a section on the line 3—3, Fig. 1; and

Fig. 4 is a perspective view of the adjustable aligning device.

In the illustrated embodiment of the invention 1 indicates a rotary turret which carries an annular series of rotary work holders of which only one is shown.

Each work holder, in this instance, is supported in forward bearings 2 and rear bearings 3 both on the turret 1. Rotation of the work holders is effected by a large internal and external gear 4 which is driven through its external portion 5 to turn the same and which through its internal portion 6 meshes with the pinions 7 of all the work holders to rotate the latter.

Each work holder, in this embodiment, comprises an outer tube 8 turning in the bearings 2 and 3 and having guided to move longitudinally therein through guides 9 a chuck carrying tube 10 which carries chuck jaws 11 for clamping the work 12 and holding the latter against rotary and longitudinal movement during the operation of the tools thereon. The chuck carrying tube is held against longitudinal movement in the outside tube 8 and its jaws are provided with cam surfaces 13 adapted to cooperate with a flared mouth portion at the adjacent end of the tube 8. Normally the jaws 11 tend to spring away from the work piece 12 but when the chuck jaws move beyond the adjacent end of the tube 8 they release the work piece, whereas, when they move inwardly so that their cam portions 13 engage the flared portion 14, the work piece 12 is clamped by the chuck jaws.

Relative movement between the outer tube 8 and the chuck carrying tube is effected, in this instance, by an axially movable collar 15 which is slidable on the reduced portion 16 of a collar 17 which is keyed at 18 to the chuck carrying tube 10. This collar carries a lever 19 pivoted at 20 to the collar and having a beveled end 21 adapted to be engaged by the collar 15 when the latter is moved in one direction. This lever 19 has a shoulder 22 which is adapted to engage a slide 23 mounted in a groove 24 in the chuck tube 10 and having a shoulder 25 adapted to engage the adjacent end of the outside tube 8. It is apparent that, when the collar 15 is shifted on the tube 10 to shift the slide 23, a relative movement will take place between the tubes 8 and 10 and thus effect engagement between the chuck jaws and the outside tubes to produce a clamping of the work 12.

The work piece 12 is fed longitudinally through the chuck tube so that successive portions thereof may be operated thereon by the tools of the machine. This longitudinal feeding of the work 12 is effected, in this instance, by a feed tube 26 arranged within the chuck tube 10 and projecting beyond the rear end of the latter. This feed tube carries adjacent the chuck, feeding jaws 27 which frictionally engage the work piece 12 and move the latter through the chuck after the work piece has been released by the chuck. The tube 26 is at 28 guided to move longitudinally in the chuck tube 10 and is held against turning movement in said tube 10.

Heretofore, the intake end of the feed tube has been of circular cross section so that it will be adapted to receive work pieces of circular or non-circular cross section. The jaws of the chuck and the feeding jaws 27 have flat faces which are aligned so that a work piece on insertion that will pass through the feeding jaws will readily pass through the jaws of the chuck to cooperate with such flat faces. There have been, however, difficulties in causing work pieces of non-circular cross section to align with the jaws of the feed tube and the chuck, and this has caused not only a waste of time but also leads to the breaking of the feed fingers of the feed tube due to the operator, in many instances, driving the stock into said jaws when the stock is not turned to the correct position.

According to this invention, provision is made whereby an alignment of the non-circular work piece with the feeding jaws and the jaws of the chuck is effected at the intake end of the feed tube. This is obtained by providing an aligning device preferably in the form of a collar 29 which has a bore or opening 30 therethrough corresponding in cross section to the cross section of the work piece and mounted to turn on the feed tube so that the internal faces of the collar will line up with the faces of the feeding jaws and the chuck. Of course this collar is replaceable by other collars having bores or openings of different cross-sections and diameters to correspond with work pieces of other cross sections. In this instance, this collar has a tapered periphery 31 and is received within a flared bore 32 of a collar or nut 33 which is secured to the end of the feed tube 26. The flared portion of the collar or nut 33 is provided with longitudinal slits 34 to make such portion yielding, and the external portion of this nut is externally threaded to receive a collar 35 formed with an internal shoulder 36. This shoulder engages the outer end of the collar 29 and forces the tapered wall of the collar into binding relation with the internal flaring wall of the nut 33, thus, holding the collar 31 adjustably in a fixed relation. In setting the position of the collar, the latter is turned until its flat faces are aligned with the flat faces of the feeding clamp and the chuck and then the collar is clamped in this adjusted position.

It will be seen from the foregoing, that there has been provided, a feed tube for screw machines in which the flat faces of the work pieces are aligned with the flat faces of the feeding clamp and chuck at the intake end of the feeding tube, thus, doing away with a waste of time required in aligning the work piece when no aligning means is provided and at the same time eliminating the breakage of the feed fingers of the feed tube.

What we claim as our invention and desire to secure by Letters Patent is:

1. A work holder for automatic tool machines comprising a chuck carrying tube, a feed tube arranged within the same and having feeding jaws, and an adjustable non-gripping aligning device at the intake end of the feed tube for aligning the faces of non-circular work with the faces of the chuck and the feeding jaws as the non-circular work freely slides through the aligning device.

2. A work holder for automatic tool machines comprising a chuck carrying tube, a feed tube arranged within the same and having feeding jaws, and an aligning device at the intake end of the feed tube for aligning the faces of non-circular work with the faces of the chuck and the feeding jaws as said non-circular work is freely sliding through the aligning device, said aligning device being rotatably adjustable on said tube.

3. A work holder for automatic tool machines comprising a chuck carrying tube, a feed tube arranged within the same and having feeding jaws, a device at the intake end of the feed tube having a flared inner wall and external threads, an aligning collar having a tapered exterior fitting the flared wall, and a nut fitting the exterior threads and having a shoulder engaging the collar to force the tapered wall of the latter into binding engagement with the flared wall.

4. In a machine of the character specified and in combination with a work-receiving tube provided with a chuck having flat faced jaws, a feed tube within and projecting at one end beyond the work-receiving tube and provided with a chuck having jaws provided with flat faces corresponding with the flat faces of the chuck applied to the work-receiving tube, means preventing relative turning of the two tubes to maintain the flat faces of corresponding jaws in alignment, and means for reciprocating the feed tube, a work guide applied to the projecting end of the feed tube and provided with flat faces corresponding with the flat faced jaws of the work-receiving and feed tube chucks, and means for securing the work guide to the projecting end of the feed tube in an adjusted position, with the flat faces thereof aligning with the flat faces of the jaws of the chucks coacting with the work-receiving and feed tubes.

5. In a machine of the character specified and in combination with a work-receiving tube provided with a chuck having flat faced jaws, a feed tube within and projecting at one end beyond the work-receiving tube and provided with a chuck having jaws provided with flat faces corresponding with the flat faces of the chuck applied to the work-receiving tube, means preventing relative turning of the two tubes to maintain the flat faces of corresponding jaws in alignment, and means for reciprocating the feed tube, a work guide applied to the projecting end of the feed tube and provided with flat faces corresponding with the flat faced jaws of the work-receiving and feed tube chucks, and a nut clamping the work guide to the feed tube in an adjusted position.

6. In a machine of the character specified and in combination with a work-receiving tube provided with a chuck having flat faced jaws, a feed tube within and projecting at one end beyond the work-receiving tube and provided with a chuck having jaws provided with flat faces corresponding with the flat faces of the chuck applied to the work-receiving tube, means preventing relative turning of the two tubes to maintain the flat faces of corresponding jaws in alignment, and means for reciprocating the feed tube, a work guide applied to the projecting end of the feed tube and provided with flat faces corresponding with the flat faced jaws of the work receiving and feed tube chucks, and externally tapered, a collar secured to the projecting end of the feed tube and internally tapered to receive the tapered portion of the work guide, and a nut fitted on the collar and engageable with the work guide to effect a clamping thereof in the required adjusted position.

7. A work holder for automatic tool machines comprising a chuck carrying tube having a work piece holding chuck at the outgoing end of the tube, a feed tube arranged within the chuck carrying tube and having feeding jaws for successively advancing a work piece into position to be gripped and held by the holding chuck and a device providing a non-circular passageway at the intake end of the feed tube for engaging the peripheral portion of a work piece so as to align the faces of the non-circular work piece with the faces of the feeding jaws and the chuck as said work piece is slid through the device toward and into the space between said feeding jaws.

EARL W. BRINKMAN.
EDWARD S. KLINE.